United States Patent
Goto et al.

(10) Patent No.: US 10,348,779 B2
(45) Date of Patent: Jul. 9, 2019

(54) DATA RECEIVING DEVICE, DATA RECEIVING METHOD, AND NON-TRANSITORY COMPUTER READABLE MEDIUM

(71) Applicant: TOSHIBA MEMORY CORPORATION, Tokyo (JP)

(72) Inventors: Masataka Goto, Kanagawa (JP); Yuta Kobayashi, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 482 days.

(21) Appl. No.: 14/659,790

(22) Filed: Mar. 17, 2015

(65) Prior Publication Data

US 2016/0050236 A1 Feb. 18, 2016

(30) Foreign Application Priority Data

Mar. 19, 2014 (JP) .................................. 2014-057036

(51) Int. Cl.
*H04L 29/06* (2006.01)
*H04L 29/08* (2006.01)

(52) U.S. Cl.
CPC ...... *H04L 65/1069* (2013.01); *H04L 65/1073* (2013.01); *H04L 67/14* (2013.01); *H04L 69/16* (2013.01)

(58) Field of Classification Search
CPC . H04L 65/1069; H04L 65/1073; H04L 67/14; H04L 69/16; H04L 67/10; H04L 49/901; H04L 69/161; H04L 29/06; H04L 29/08; G06F 13/14; H04N 21/42661
See application file for complete search history.

(56) References Cited

U.S. PATENT DOCUMENTS

| | | | |
|---|---|---|---|
| 7,206,864 B2 | 4/2007 | Enko et al. | |
| 7,310,664 B1 * | 12/2007 | Merchant | H04L 41/0886 709/220 |
| 2002/0112008 A1 * | 8/2002 | Christenson | H04L 51/30 709/206 |
| 2004/0010612 A1 * | 1/2004 | Pandya | H04L 29/06 709/230 |
| 2005/0044162 A1 * | 2/2005 | Liang | G06F 17/30067 709/212 |
| 2006/0029000 A1 * | 2/2006 | Waldvogel | H04L 69/16 370/254 |

(Continued)

FOREIGN PATENT DOCUMENTS

| | | |
|---|---|---|
| JP | H10-214217 | 8/1998 |
| JP | 2005-316629 | 11/2005 |

*Primary Examiner* — Sargon N Nano

(74) *Attorney, Agent, or Firm* — Oblon, McClelland, Maier & Neustadt, L.L.P.

(57) ABSTRACT

There is provided a data receiving device including a reception controller and a read controller. The reception controller controls an access processing device to write data received through a session established with a communication device on a network to a file on a storage. The read controller manages registration information indicating association between the file and the session, and upon receiving a data reception request specifying a session from an application, outputs a read request for data of the file associated with a specified session to the storage and receive the data read from the storage.

17 Claims, 5 Drawing Sheets

(56) References Cited

U.S. PATENT DOCUMENTS

| | | | |
|---|---|---|---|
| 2007/0234295 A1* | 10/2007 | Dufour | G06F 11/3644 717/124 |
| 2007/0282951 A1* | 12/2007 | Selimis | H04L 67/06 709/205 |
| 2009/0037550 A1* | 2/2009 | Mishra | G06F 9/485 709/208 |
| 2009/0043776 A1* | 2/2009 | Moshayedi | H04L 67/06 |
| 2009/0070475 A1* | 3/2009 | Handa | H04L 67/14 709/228 |
| 2009/0193486 A1* | 7/2009 | Patel | H04N 5/76 725/114 |
| 2011/0082909 A1* | 4/2011 | Ishibashi | H04L 29/04 709/217 |
| 2012/0179827 A1* | 7/2012 | Xue | H04L 63/08 709/227 |
| 2013/0212165 A1* | 8/2013 | Vermeulen | G06F 17/30212 709/203 |
| 2015/0113152 A1* | 4/2015 | Sreeramoju | H04L 63/1458 709/228 |
| 2017/0185327 A1* | 6/2017 | Powell | G06F 3/0619 |

* cited by examiner

| PROCESS ID (PID) | FILE DESCRIPTOR (FD) | SOCKET DESCRIPTOR (SOCK) |
|---|---|---|
| 1234 | | 4 |
| 1250 | | 5 |
| ... | | ... |

| PROCESS ID (PID) | FILE DESCRIPTOR (FD) | SOCKET DESCRIPTOR (SOCK) |
|---|---|---|
| 1234 | 3 | 4 |
| 1250 | | 5 |
| ... | ... | ... |

US 10,348,779 B2

DATA RECEIVING DEVICE, DATA RECEIVING METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2014-057036, filed Mar. 19, 2014; the entire contents of which are incorporated herein by reference.

FIELD

Embodiments described herein relates to a data receiving device, a data receiving method, and a non-transitory computer readable medium.

BACKGROUND

Recently, burdens of large investment to infrastructure for realizing continuous connection of a network and continuous high-speed communication have been a problem. Therefore, a high-speed communication environment is becoming a situation that high-speed communication can be realized only when conditions of a short distance, a small number of terminals, and the like are satisfied. In the meantime, a data storage unit price of a storage continues to decline. Therefore, methods that the storage of a large capacity is loaded on a terminal, a large amount of data is acquired and stored in the storage in a short time during which the conditions of the high-speed communication are satisfied, and an application reads the data on the storage and utilizes it are being devised.

As one of the methods, the method that a proxy server is loaded on a terminal, and when being online, data to be utilized by a specific application is received from a network and temporarily preserved in a storage of the terminal is known. By this method, the application can read the data from the storage and utilize it when being offline later. However, in order to realize the method, an architecture of the application needs to support the proxy server.

DETAILED DESCRIPTION

According to one embodiment, a data receiving device includes a reception controller and a read controller. The reception controller controls an access processing device to write data received through a session established with a communication device on a network to a file on a storage. The read controller manages registration information indicating association between the file and the session, and upon receiving a data reception request specifying a session from an application, outputs a read request for data of the file associated with a specified session to the storage and receive the data read from the storage.

Hereinafter, with reference to drawings, an embodiment of the present invention will be described.

Figure 1:
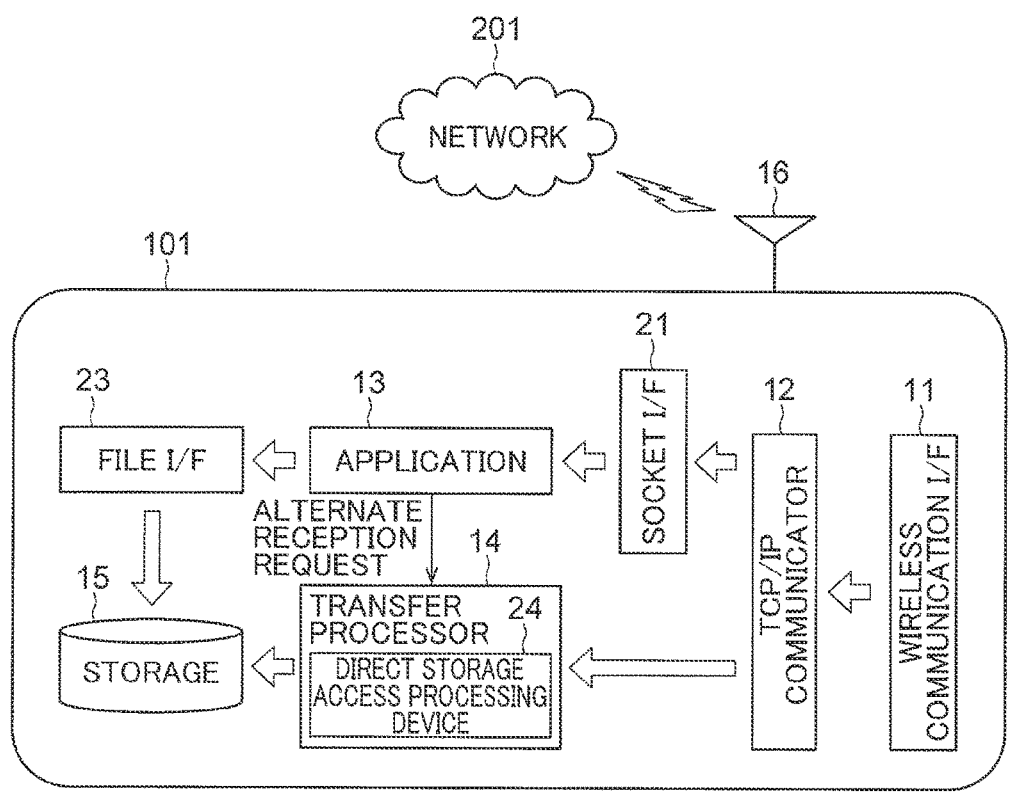
FIG. 1 is a diagram illustrating an entire configuration of a system including a data receiving device according to an embodiment of the present invention.

FIG. 1 illustrates an entire configuration of a system including a data receiving device according to the embodiment of the present invention. On a lower part of FIG. 1, a rough functional block diagram of a data receiving device 101 is illustrated.

The data receiving device 101 is connected to a network 201. The network 201 is a wireless network, a cable network, or a hybrid network of these, and is the Internet as one example. The data receiving device 101 communicates with a communication device, which is an opposite device, through the network 201. In the present embodiment, the data receiving device 101 is connected to the network 201 by wireless.

The data receiving device 101 is loaded on a communication terminal such as a PC, a smartphone, a tablet, a portable terminal, or the like. The data receiving device 101 is loaded with a wireless communication I/F 11, a TCP/IP communicator 12, an application 13, a transfer processor 14, a storage 15, an antenna 16, a socket I/F (session establisher) 21, and a file I/F 23. The transfer processor 14 includes a direct storage access processing device 24 as an access processing device which is hardware that writes data to the storage 15 at a high speed.

The data receiving device 101 communicates with a communication device, which is an opposite device, on the network 201 according to a communication protocol of TCP/IP or the like, and receives data from the opposite device. The data receiving device 101 preserves the data received from the opposite device in the storage 15 in a form of files. At the time, in the data receiving device 101, the direct storage access processing device 24 performs processing of storing in the storage 15. That is, reception data is not written to the storage through a storage device such as a main memory by a host CPU but is directly written to the storage 15 by the direct storage access processing device 24. Thus, while suppressing loads on the host CPU to be low, high-speed data reception is made possible. Also, the application 13 operated on the host CPU reads the data preserved in the storage 15 through a normal API (application program interface), for instance, a system call ("read( )" function or the like) included in an operating system (OS) executed on the host CPU. Thus, the high-speed data reception and data read utilizing the normal API are both realized.

The wireless communication I/F 11 is a wireless communication interface which performs wireless communication according to an arbitrary communication standard. A wireless network to be connected may be a wireless LAN, a communication network of a cellular phone such as a 3G network, or the wireless network of the other kind. Here, the case of including the wireless communication I/F 11 is illustrated, however, a configuration may be such that a cable communication I/F is provided and connected to a cable network.

The TCP/IP communicator 12 is a processor that transmits and receives the data to/from the opposite device according to a procedure of an Internet protocol (IP) established by IETF and a Transmission Control Protocol (TCP). Details of the TCP are generally known as described in RFC 793 (https://www.ietf.org/rfc/rfc793.txt) or the like.

The storage 15 is a storage device that is managed according to a prescribed file system and stores the data in the form of files. The storage 15 is generally an HDD, an SDD (Solid State Drive), or the like. It is also possible to use a NAND flash memory card like an SD memory card. As long as it is the storage having a storage interface that the direct storage access processing device 24 can support, the arbitrary one can be used.

The application 13 is an application program used by a user of the data receiving device 101, and is executed by the host CPU. There are various applications 13 such as a tool of a game, a web browser, or the like. The application 13 transmits and receives the data to/from the network 201 through the socket I/F 21 that manages generation and deletion of a session (socket). Also, by utilizing the system call of the OS or the like through the file I/F 23, the data can be read from the storage 15.

Also, the application 13 issues an alternate reception request that requests the transfer processor 14 to write the data received from the network 201 to the storage 15. The application 13 sends the issued alternate reception request to the transfer processor 14. The alternate reception request may be given to the transfer processor 14 by loading an issuing function of the alternate reception request on the OS and having the application 13 call the function, or the alternate reception request may be directly issued and given by the application 13.

The alternate reception request includes session information of the TCP in the TCP/IP communicator 12 and data writing destination information. The session information includes, for instance, an IP address of the present device, a TCP port number of the present device, and a sequence number of the TCP of the session. The IP address of the opposite, the TCP port number of the present device and the other information related to the session may be included. Also, the data writing destination information includes a file descriptor which is an identifier of the file of a writing destination in the storage 15, a file size of the file, and the like.

When the alternate reception request is received from the application 13, the transfer processor 14 uses the direct storage access processing device 24 to perform the processing of writing the data received in the TCP/IP communicator 12 to the storage 15. The data to be written is the data received in the session indicated in the session information included in the alternate reception request. A storage area (writing destination) of the storage 15 to write the received data is the file indicated in the writing destination information included in the alternate reception request. Also, the direct storage access processing device 24 may be able to read the data from the storage 15 in addition to the data write to the storage 15.

The application 13 reads the data of the file written to the storage 15 by the direct storage access processing device 24 through the file I/F 23. The application 13 specifies the file to be read by instructing the file descriptor of the file to be read to the file I/F 23. The writing of the data to the storage 15 by the direct storage access processing device 24 and the reading of the data from the storage 15 by the application 13 can be simultaneously performed in parallel as well. For the data read by the file I/F 23, the data may be read by accessing the storage 15 using the direct storage access processing device 24, or an access route different from the direct storage access processing device 24 may be provided for the storage 15 to perform the read from the access route.

The above is the outline of an operation and the configuration of the present data receiving device. Below, further detailed configuration and operation will be illustrated.

Figure 2:
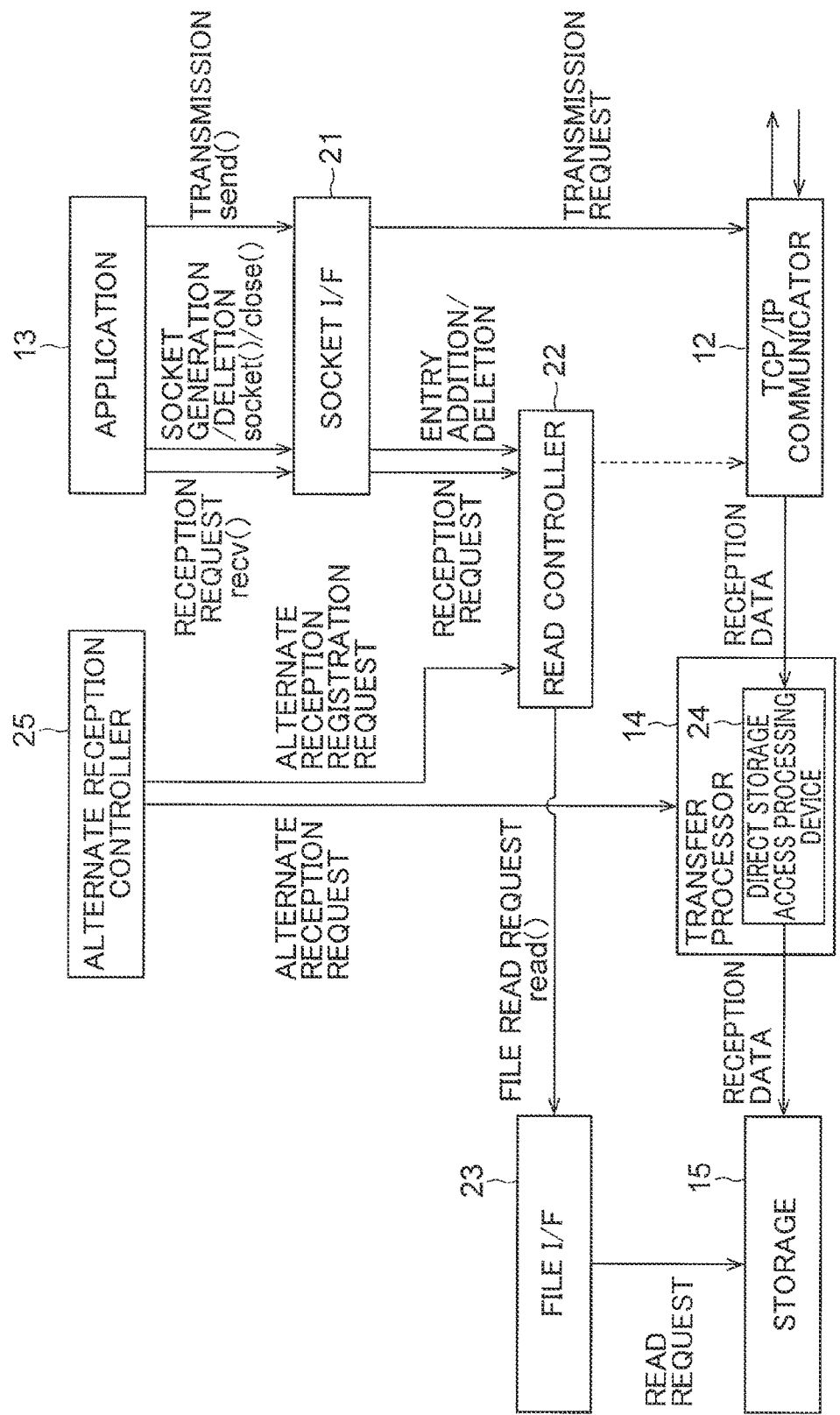
FIG. 2 is a diagram illustrating a detailed block configuration from a TCP/IP communicator to a storage in the data receiving device illustrated in FIG. 1.

FIG. 2 illustrates a detailed block configuration from the TCP/IP communicator 12 to the storage 15 in the data receiving device illustrated in FIG. 1.

In addition to the configuration illustrated in FIG. 1, a read controller 22 and an alternate reception controller 25 to be one of features of the present embodiment are provided. Illustrations of the wireless communication I/F and the antenna are omitted. Descriptions that overlap with FIG. 1 will be omitted below.

The socket I/F 21 is a processor that provides a socket interface (http://www.freebsd.org/doc/ja/books/design-44bsd/ overview-ipc.html) provided by the system call of Linux (https://www.kernel.org/), BSD (http://www.freebsd.org/, http://www.netbsd.org/), or the like. The socket interface is also called a BSD socket interface. For these interfaces, for instance, the ones generally provided in the OS may be utilized.

The application 13 uses the system call provided by the socket I/F 21 to generate the socket and delete the generated socket. Also, the application 13 utilizes the generated socket to transmit and receive the data, a message, or the like to/from the opposite device on the network 201.

The application 13 generates the socket indicating a TCP session by performing a "socket( )" system call. To the generated socket, a socket descriptor is imparted. The socket is identified by the socket descriptor. Also, the application 13 closes (deletes) the socket by specifying the socket descriptor and performing a "close( )" system call.

Here, the socket descriptor is an identifier indicating the TCP session in a connection state. The socket I/F 21 holds the association between the socket descriptor and the session information (including a present IP address, a present TCP port number, a present TCP sequence number, an opposite IP address, an opposite TCP port number, an opposite TCP sequence number, or the like). A data type of the socket descriptor is a positive number. The socket indicates a set of the socket descriptor and the session information.

Also, the application 13 issues a transmission request of the data by performing a "send( )" system call in the state that the socket is generated (that is, in the state that the session is generated).

Also, by performing a "recv( )" system call, a reception request of the data is issued.

The "send( )" system call and the "recv( )" system call both take the socket descriptor for an argument. The application 13 specifies the socket descriptor and performs the "send( )" or "recv( )" system call. In the "send( )" system call, the data to be transmitted is also specified. The data to be transmitted is present in a memory such as a main memory for instance. It may be also present in the storage 15.

When the socket is generated by the "socket( )" system call, the socket I/F 21 adds an entry to a prescribed registration table. The registration table is held inside the read controller 22. However, the registration table may be held not in the read controller 22 but in a storage that can be accessed from the read controller 22.

Figures 3A, 3B, 4:
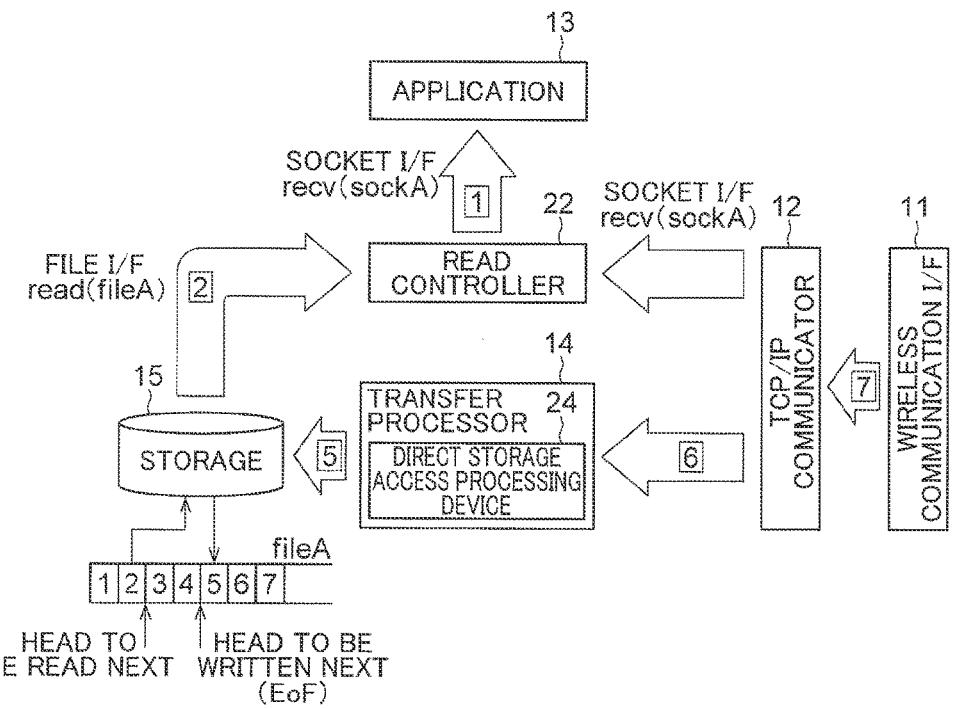
FIGS. 3A and 3B are diagrams illustrating examples of a registration table.
FIG. 4 is a diagram for illustrating an operation example of the data receiving device according to the embodiment of the present invention.

FIG. 3A illustrates an example of the registration table. The registration table has individual fields of a process ID, the file descriptor, and the socket descriptor. When the socket is generated, the socket I/F 21 generates the entry including only a part of information, that is, only the process ID and the socket descriptor, as the entry, and adds it to the registration table. FIG. 3A illustrates a state that such an entry is added.

The socket I/F 21 outputs the transmission request to the TCP/IP communicator 12 when a request of data transmission is received from the application 13 through the "send( )" system call. The transmission request includes, as an example, the process ID, the socket descriptor, and information (memory address or the like) on the storage area where transmission data is stored. The storage area where the transmission data is stored may be an arbitrary storage such as the main memory, a memory different from it, the storage 15, or the like for instance. The TCP/IP communicator 12 can access the TCP session information indicated by the socket descriptor from the socket descriptor. Also, to the TCP/IP communicator 12, the TCP session information indicated by the socket descriptor itself may be delivered instead of the socket descriptor, or in addition to it.

When the transmission request is received from the socket I/F 21, the TCP/IP communicator 12 reads the requested transmission data from the storage area specified by the transmission request. The TCP/IP communicator 12 forms the read data into a packet of a message format corresponding to a communication protocol according to the TCP session information. The TCP/IP communicator 12 transmits the packet to the network 201. An example of the transmission data is a GET request message that requests transmission of specific data or a specific file held by the opposite device on the network 201. In this case, the TCP/IP communicator 12 reads the GET request message from the storage area of the memory or the like and transmits it.

On the other hand, the socket I/F 21 outputs the reception request to the read controller 22 when the request of data reception is received through the "recv( )" system call from the application 13. The reception request includes, as an example, the process ID and the socket descriptor. In the reception request, the TCP session information indicated by the socket descriptor may be included in addition to the socket descriptor.

The TCP/IP communicator 12 receives the reception request from the read controller 22 or the transfer processor 14. The reception request includes the session information and a memory address of a transferring destination of the reception data. The TCP/IP communicator 12 receives the data of the session indicated by the session information from the network 201, and writes the received data to the memory address specified in the reception request. The memory address specified in the reception request is an address of a receiving buffer inside the direct storage access processing device 24 in the case that the reception request is the one from the transfer processor 14. In the case that it is the one from the read controller 22, an address of an external main memory or the like is specified.

The alternate reception controller 25 sends an alternate reception request to the transfer processor 14 and an alternate reception registration request to the read controller 22. The alternate reception request is a request to receive the data inputted from the network 201 from the TCP/IP communicator 12 and write it to the storage 15 by the direct storage access processing device 24 (instead of the host CPU). The alternate reception registration request is a request to read the data of the session requested to be received from the socket I/F 21 from the storage 15 by the read controller 22. The alternate reception controller 25 may be included in one function of the OS for instance.

For the alternate reception request and the alternate reception registration request, for instance, the alternate reception request may be sent first and the alternate reception registration request may be sent thereafter. Or, the alternate reception registration request may be sent first and the alternate reception request may be sent thereafter. Or, they may be sent simultaneously.

The alternate reception controller 25 may receive a notice of socket generation by the application 13 or the socket I/F 21, and issue and output the alternate reception request and the alternate reception registration request. Or, it may be detected that the system call of the socket generation is called by the application 13 and the alternate reception request and the alternate reception registration request may be issued and outputted. These requests may be issued and outputted when conditions other than the ones described here are established.

The alternate reception request sent from the alternate reception controller 25 to the transfer processor 14 includes, as described above, the session information of the TCP and the data writing destination information. The data writing destination information includes, as described above, the file descriptor, the file size of the file, and the like. The file descriptor is, for instance, generated by the alternate reception controller 25 and allocated to the file.

When the alternate reception request is received from the alternate reception controller 25, the transfer processor 14 outputs the reception request of the data related to the session indicated by the session information to the TCP/IP communicator 12. The direct storage access processing device 24 receives the data related to the session from the network 201, and writes it to the receiving buffer in itself. The direct storage access processing device 24 reads (or makes the storage 15 read) the data from the receiving buffer according to a data storage situation of the receiving buffer, and writes it to the file to which the file descriptor is allocated, in the storage 15. Details of the operation of the transfer processor 14 will be described later using FIG. 5.

The alternate reception registration request delivered from the alternate reception controller 25 to the read controller 22 includes the information related to the TCP session prepared by the application 13, and the file descriptor of the file stored on the storage 15. It is assumed here that the information related to the TCP session includes the process ID of the application and the socket descriptor. Therefore, alternate reception registration includes the process ID, the file descriptor, and the socket descriptor.

When the alternate reception registration request is received, the read controller 22 retrieves the entry including a set of the process ID and the socket descriptor included in the request from the registration table held inside. In a file descriptor field of the matching entry, the file descriptor included in the request is registered. An example of a state that the file descriptor is registered is illustrated in FIG. 3B. By registering the entry including values of these three fields, the alternate reception registration related to the session indicated in the socket descriptor is completed.

When the reception request is received from the socket I/F 21, the read controller 22 retrieves the entry including the set of the socket descriptor included in the reception request and the process ID of the application 13 from the registration table. In the case that there is the entry, and the file descriptor is registered in the entry, it means that the data of the session indicated by the socket descriptor is alternately received by the direct storage access processing device 24. Therefore, the read controller 22 requests the file I/F 23 to read the data from the file stored in the storage 15 using the file descriptor described in the entry. The data read by the file I/F 23 from the file on the storage 15 is returned to the socket I/F 21 as a response to the reception request. The socket I/F 21 delivers the data to the application 13.

Here, an operation if the data read from the file on the storage 15 is empty depends on design of the application 13. For instance, there is a case of giving a response indicating that the data is not present (the response indicating empty data), or storage of the reception data in the file on the storage 15 is waited for and it is read from the file again or the like. Or, it is also possible to request the reception to the TCP/IP communicator 12.

On the other hand, in the case that the file descriptor is not registered in the entry including the set of the socket descriptor and the process ID, or in the case that the entry is not present, the read controller 22 outputs the reception request to the TCP/IP communicator 12 (it is indicated by a dotted line with an arrow in FIG. 2). In this case, alternate reception of the data of the session indicated by the socket descriptor is not performed by the direct storage access processing device 24. Therefore, on the basis of normal TCP/IP communication, the data is received and written (written to the main memory or the like) by processing of the host CPU. In this case, the socket I/F 21 receives the reception data from the TCP/IP communicator 12 through the main memory or the like.

In the descriptions described above, the entry including the process ID and the socket descriptor is added to the registration table when the socket is generated and the file descriptor is registered inside the entry according to issuance of the alternate reception registration request, however, the entry can be prepared also by a method different from that. For instance, the entry is not added to the registration table when the socket is generated, and the entry including the process ID, the file descriptor and the socket descriptor is added to the registration table at the point of time when the read controller 22 receives the alternate reception registration request. In this case, the read controller 22 retrieves the entry including the set of the socket descriptor and the process ID included in the reception request when the reception request is received from the socket I/F 21, and confirms whether or not a matching entry is present. When the matching entry is present, it can be determined that the data of the session is alternately received by the direct storage access processing device 24 (without confirming presence/absence of the file descriptor). Thus, in this case, the read controller 22 requests the reading of the file to the file I/F 23 without outputting the reception request to the TCP/IP communicator 12. On the other hand, when the matching entry is not present in the registration table, it is determined that alternate reception by the direct storage access processing device 24 is not performed, and the reception is requested to the TCP/IP communicator 12.

Hereinafter, using FIG. 4, a specific example of the operation of the data receiving device according to the present embodiment will be described. The operation after the alternate reception is requested to the transfer processor 14 and the alternate reception registration is requested to the read controller 22 will be described. Numerals "1", "2", "3", "4", "5", "6", and "7" enclosed by a rectangular frame in the figure indicate the reception data received in the order of the numerals in the same TCP session.

The pieces of the data "1" and "2" are already received and written in order from the head in the file (file A) on the storage 15 by the direct storage access processing device 24.

The application 13 has already specified the socket descriptor (though it is expressed as "sockA" in the figure, it may be actually a numerical value) and issued a reception request "recv( )" system call to the socket I/F.

The read controller 22 receives the reception request due to the "recv( )" system call from the socket I/F, specifies the file descriptor "fileA" (actually, the file descriptor may be a numerical value), and requests the reading of the file to the file I/F. The pieces of the data "1" and "2" are successively read from the head of the corresponding file on the storage 15, and returned to the application 13 as the reception data of the session indicated by the socket descriptor "sockA".

Also, the pieces of the data "3" and "4" are successively received from the network 201, and written to the file on the storage 15 so as to follow the data "2". Further, the pieces of the data "5", "6", and "7" are also successively received and are to be written to the file A.

The next reading head position from the file of the file descriptor "fileA" is realized by management of file I/O in the file I/F 23.

Also, management of a head position to write the data next by the direct storage access processing device 24 (that is, the end of the file ("EoF": End of File)) is realized by the direct storage access processing device 24.

Though omitted from the figure, update of the end of the file ("EoF") by the direct storage access processing device 24 can be recognized as a mechanism of the file system also by the file I/F 23.

A state that the next reading head position and the next writing head position ("EoF") overlap is the state that there is no reception data that is not read yet in the file. When the data is to be read from the storage 15 in the state, as described above, it is the case that the read data from the file is empty.

By the operation described above, while the data received from the network 201 is written to the storage 15 by the direct storage access processing device 24, the written data can be read utilizing the general API, that is, the API (system call) provided by the socket I/F and the file I/F, from the application.

Figure 5:
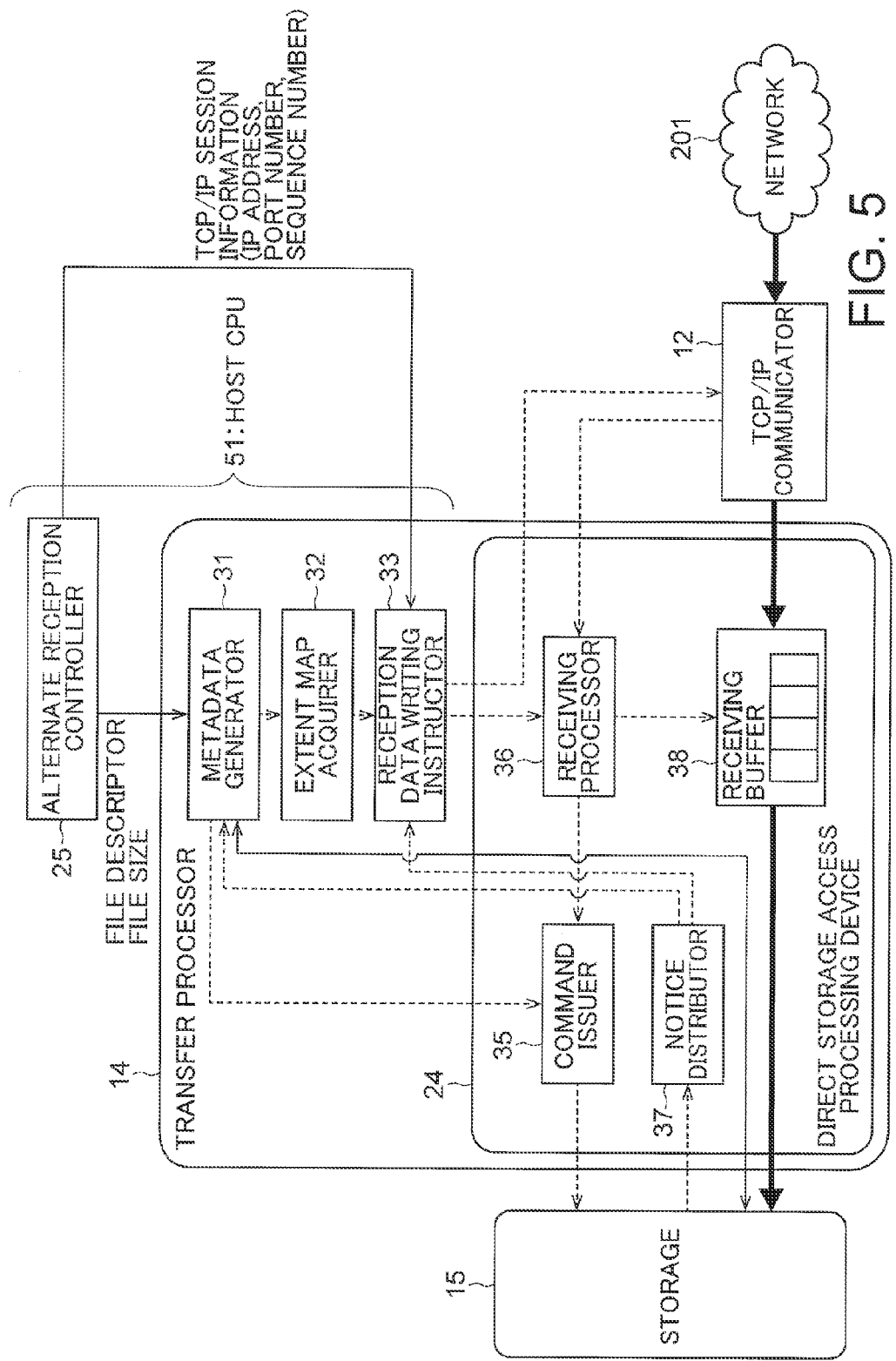
FIG. 5 is a diagram illustrating a detailed configuration of a transfer processor and a direct storage access processing device according to the embodiment of the present invention.

FIG. 5 illustrates a detailed configuration of the transfer processor 14 and the direct storage access processing device 24. The transfer processor 14 includes, in addition to the direct storage access processing device 24, a metadata generator 31, an extent map acquirer 32, and a reception data writing instructor 33. The direct storage access processing device 24 includes a command issuer 35, a receiving processor 36, a notice distributor 37, and a receiving buffer 38. The metadata generator 31, the extent map acquirer 32, and the reception data writing instructor 33 are realized by a host CPU (OS) 51. The alternate reception controller 25 is also realized by the host CPU (OS) 51. A broken line with an arrow in the figure illustrates a flow of control, a thick solid line with an arrow illustrates a flow of the data received from the network 201, and a thin solid line with an arrow illustrates a flow of the data other than the received data.

The storage 15 manages data in block units. As one example, management is performed in units called sectors. Here, they are abstracted and called blocks. Since the data handled by a user is not in block units, the storage 15 is normally accessed by a file system. The file system maps the data in byte units in a storage area in block units of the storage 15. Each block is identified by an address of each block, respectively. For the file system, a known one may be utilized.

Typically, in the file system, metadata is stored in a predetermined area on the storage. The metadata includes map information that associates the data and a position where the data is stored with each other, and the other various kinds of information (a file descriptor, a time stamp or the like). When writing the data to the storage, first, a metadata group stored in the predetermined area is read (or the metadata group read to a main memory beforehand may be used), the metadata group is analyzed, and from an analysis result and a size of the data, the position (area) to write the data is specified. When a writing position is specified, the metadata related to the data is generated, and the generated metadata is written to the predetermined area of the storage. At the time, in the metadata, the map information indicating which position (block) the data is to be actually stored is included. Also, according to the map information, the data is written to the storage. In the present embodiment, an example of using an extent map as the map information is illustrated.

Figure 6:
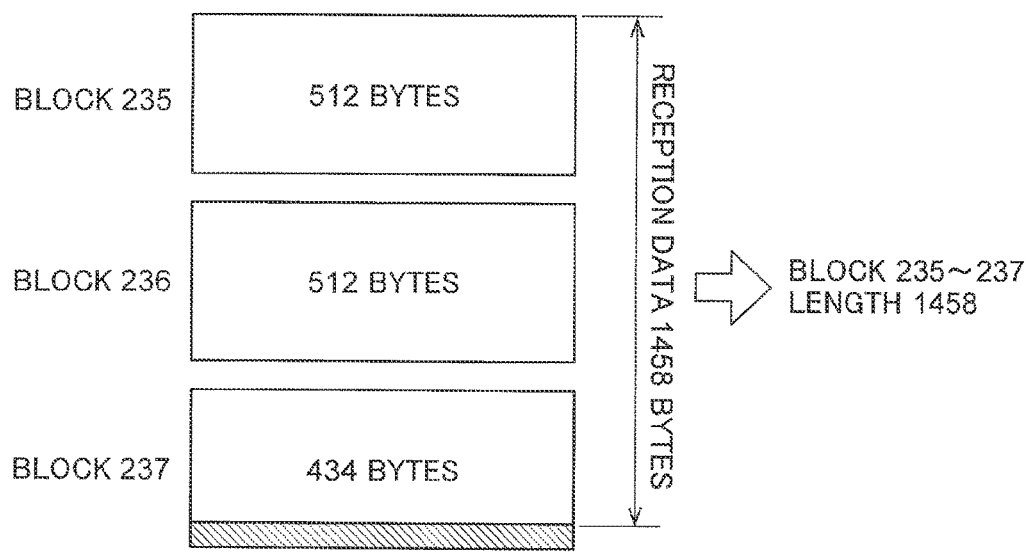
FIG. 6 is a diagram illustrating an extent map.

The extent map is described using FIG. 6. Here, it is defined that one block of the storage is 512 bytes. The situation that the data of a certain portion of desired data is stored in blocks 235-237 is illustrated. The data is started to be written from a head of the block 235, and is continuously written in all of the blocks 235 and 236 and to the 434th byte of the block 237. A length of the data to be written is 1458 bytes. In this case, the extent map is indicated as "blocks 235-237, length 1458" or the like.

In the example described here, the position where the data is stored in the storage is indicated by the blocks and the data length, however, an expression form does not matter as long as the position where the data is stored can be specified. For instance, it may be indicated by a start byte position and an end byte position or the like.

Also, the example indicated here illustrates the case of storing one piece of data in a continuous block area, however, the extent map may be a form that the plurality of pieces of data are discrete respectively and stored in the continuous block areas respectively. For instance, one extent map may indicate two scattered areas of the data (1458 bytes) stored over the blocks 235 and 236 and a portion from the head of the block 237 and the data (2000 bytes) stored over the blocks 346-349 and a portion from the head of the block 350.

In such a manner, the extent map includes information that specifies the blocks where the data is stored, and information (effective data position information) that specifies the position or a range where effective data is actually stored in the blocks. By these pieces of information, where in the storage the desired data is stored can be specified.

As the file system, not only the above extent-based file system but also a cluster (block)-based file system is possible. In the case of the cluster-based file system, an area where the data is stored is specified by a list of clusters instead of extents (the clusters may be discretely arranged). This case can be also considered similarly when it is considered as a special case of the extent (the case that the length of one extent is fixed to a cluster size). Descriptions will be given hereinafter using a term of the extent, however, it is assumed that the present embodiment includes both of them.

A RAID (Redundant Array of Inexpensive Disks) function may be loaded on the storage 15. Or, the RAID function may be provided in an I/F with the storage 15 inside the direct storage access processing device 24. Since both cases are not related to the essence of the present embodiment, they are omitted in the descriptions.

For the data received from the network 201, the metadata generator 31 generates the metadata including the extent map indicating the writing position of the data in the storage 15. Also, the metadata generator 31 performs the processing for writing the generated metadata to the storage 15 through the direct storage access processing device 24.

More in detail, when the file descriptor, the file size, and the like are received from the alternate reception controller 25, the metadata generator 31 acquires the metadata group stored in the prescribed area of the storage 15 in order to confirm usages of a data storing area of the storage 15. In order to acquire the metadata, a read request of the metadata is sent to the direct storage access processing device 24, and the command issuer 35 issues a reading command of the metadata and sends it to the storage 15, on the basis of the read request. The storage 15 executes the reading command of the metadata, and outputs the metadata inside the predetermined area to the metadata generator 31. Or, the metadata group may be read to the main memory by a similar method beforehand and the metadata may be acquired from the main memory.

The metadata generator 31 specifies a position (the address of one or more blocks, and an effective data position inside the block as needed) for storing the file indicated in the file descriptor on the basis of the acquired metadata group, and generates the metadata including the map information (extent map) indicating the specified area, the file descriptor, and the like. The metadata generator 31 delivers the generated metadata to the extent map acquirer 32, and also sends a write request of the generated metadata to the command issuer 35. The command issuer 35 receives the write request of the metadata, issues a writing command of the metadata, and sends it to the storage 15. The storage 15 executes the writing command of the metadata, and stores the metadata requested to be written in the predetermined area in the inside.

The extent map acquirer 32 extracts the extent map of the file to be a writing target from the metadata generated in the metadata generator 31. Also, the extent map may not be acquired from the metadata generator 31 but may be acquired by referring to the metadata generated by the metadata generator 31, which is cached to the memory beforehand. The extent map acquirer 32 delivers the extent map acquired in such a manner to the reception data writing instructor 33.

The reception data writing instructor 33 outputs the extent map and information indicating the reception of the data (the session information of the data to be received or the like) to the direct storage access processing device 24. Thus, the reception of the data and the writing of the data to the storage 15 are instructed to the direct storage access processing device 24.

The direct storage access processing device 24 performs the processing of receiving the data from the network 201 and writing the received data to the storage 15 in place of a host CPU 51.

The direct storage access processing device 24 may be configured by either of hardware and software or may be configured by both of them. A form of implementation does not matter but a hardware-based configuration is desirable from a viewpoint of processing efficiency. As a specific implementation form of the direct storage access processing device 24, an FPGA or an exclusive LSI is assumed.

The receiving buffer 38 temporarily stores the data inside inputted from the TCP/IP communicator 12. In the drawings, an area inside a frame indicating the receiving buffer 38 is sectioned by vertical lines for each block size of the storage 15 and expressed. The receiving buffer 38 stores the data inputted from the TCP/IP communicator 12 by an arbitrary system. There may be a form of storage in the address instructed from the receiving processor 36, a form of the storage in an input order (such as FIFO), or the like. The latter form of the storage in the input order is effective in the case that input of the transmission data (file data or the like) transmitted by the opposite device to the receiving buffer 38 in order from the data on a head side is secured for instance. In the case of receiving an outputting instruction of the data from the storage 15, the receiving buffer 38 outputs the instructed data to the storage 15. Or, a configuration of outputting the instructed data to the storage 15 according to the outputting instruction from the receiving processor 36 is also possible.

The receiving processor 36 receives a notice related to the information of the extracted data every time the data is extracted from a frame in the TCP/IP communicator 12. The receiving processor 36 manages a receiving status of the data as buffer information on the basis of the notice from the TCP/IP communicator 12.

In the case that the data is stored in the receiving buffer 38 in order from the data on the head side of the transmission data (file data or the like) transmitted by the opposite device, the receiving processor 36 can recognize to which block of the blocks indicated in the extent map the data is received on the basis of the notice from the TCP/IP communicator 12. In this case, every time the data for one block is stored from the head side of the data, for instance, the receiving processor 36 specifies the block to store that data from the extent map and sends a request to write that data to the specified block to the command issuer 35. The pieces of data for the plurality of blocks may be put together and the write request may be sent. There is a case that the data for the block size is not stored in the block at the end, and at the time, padding data is added to form the data for the block size. The command issuer 35 receives the write request of the data from the receiving processor 36, and issues the command for writing the specified data in the specified area of the storage 15. The command issuer 35 outputs the issued command to the storage 15.

Also, the receiving processor 36 may recognize the data at which position in the transmission data (file data or the like) of the opposite device is received and instruct the receiving buffer 38 to store that data in the address corresponding to a relative position inside the transmission data. This is possible since the individual data configuring the transmission data (file data or the like) of the opposite device and the sequence number can be associated in the case of the TCP/IP for instance. For instance, in the TCP/IP, one byte corresponds to one sequence number. In this case, the receiving buffer 38 stores the data in the address instructed from the receiving processor 36. The receiving processor 36 specifies the data to be written to the storage 15 according to the writing status of the receiving buffer 38, and requests the writing of the specified data in the storage 15 to the command issuer 35. According to the read request from the storage 15 that executes the command, the receiving buffer 38 outputs the data. Also, the receiving processor 36 may instruct the output of the data to the receiving buffer 38 and the storage 15 may fetch the data to the inside. When the data for the block size is stored in the receiving buffer 38 for each block of the blocks indicated in the extent map for instance, the receiving processor 36 sends the request to write that data to a relevant block to the command issuer 35. The command issuer 35 receives the write request, and issues the command for writing the specified data in the specified area of the storage 15. The command issuer 35 outputs the issued command to the storage 15.

The command issuer 35 receives the write request or the read request from the receiving processor 36 or the metadata generator 31. For instance, the command issuer 35 receives the write request of the reception data from the receiving processor 36. Also, from the metadata generator 31, the write request or the read request of the metadata is received. The command issuer 35 issues the command to execute the requested processing, and outputs the issued command to the storage 15. The command includes the information indicating the area (block) of a writing destination or the area of a reading destination as well.

Also, the command issuer 35 may receive the read request from the file I/F 23 illustrated in FIG. 2, issue the command to execute the requested processing, and output the issued command to the storage 15. At the time, the file I/F 23 may specify the area where the file is stored from the file descriptor by analyzing the metadata group inside the prescribed area of the storage 15, and send the read request to read the data from the specified area to the command issuer 35.

Here, the command issued by the command issuer 35 follows I/F specifications on the side of the storage 15. There is a case that the number of writing blocks that can be specified at one time is limited or there is a limitation that discrete blocks cannot be simultaneously specified or the like. In this case, the command issuer 35 sometimes generates a plurality of command groups from one instruction from the receiving processor 36 or the metadata generator 31.

With the case of FIG. 6 described above as an example, an operation example of the receiving processor 36 and the command issuer 35 will be illustrated. It is assumed that the data of 1458 bytes illustrated in FIG. 6 is received from the network 201 and is stored in the receiving buffer 38. In this case, since the data larger than the block size is written in the receiving buffer 38, the writing command is issued. At the time, the writing position of the storage 15 is specified from the extent map. Here, it is assumed that the extent map is specified so as to write the data from the head of the block 235. For the block 235 and the block 236, since the data for the block size is written in the receiving buffer 38, the writing command to the block 235 and the block 236 is issued. For the block 237, it is assumed that the data of the block size is not written in the receiving buffer 38 but the reception of the reception data is completed. Therefore, the padding data for the last 78 bytes is generated, and the padding data is appended behind the data of a first half. For the data after append (the data for the block size), the writing command to the block 237 is issued.

In the present embodiment, while the command issuer 35 issues the command to write the reception data with the request from the receiving processor 36 as a trigger, the command issuer 35 itself may monitor the receiving buffer 38, detect that the data for the block size is written to the receiving buffer 38, and issue the command.

The notice distributor 37 receives a completion notice of the command issued by the command issuer 35 from the storage 15, and notifies a writing completion notice or a reading completion notice to the metadata generator 31, the reception data writing instructor 33, or the file I/F 23 according to the notice contents.

Specifically, the notice distributor 37 returns the writing or reading completion notice to the metadata generator 31 in the case of receiving the command completion notice for the write or read of the metadata. In the case of receiving the command completion notice for the writing of the reception data, the writing completion notice is returned to the reception data writing instructor 33. In the case of receiving the writing completion notice, the reception data writing instructor 33 may notify that the reception of the data and the writing of the data to the storage 15 are completed to the application 13. Also, in the case of receiving the reading command completion notice of the reception data, the notice distributor 37 may return the reading completion notice to the file I/F 23.

Also, the storage 15 cannot complete the execution of the command delivered from the command issuer 35 for some reasons such as an internal error in some cases. For instance, various reasons such as occurrence of timeout, the fact that the data (the reception data or the metadata) to be written to the storage 15 is not stored in the memory, and the like are possible. In this case, the storage 15 gives an error notice to the direct storage access processing device 24. At the time, in order to allow the host CPU 51 to obtain the information of the error, the notice distributor 37 of the direct storage access processing device 24 may relay the error notice to the host CPU 51 so that the host CPU 51 can also recognize the error information.

As described above, according to the present embodiment, the reception data can be directly written at a high speed without interposing the host CPU 51 by the direct storage access processing device without limiting the architecture of the application to support the proxy.

That is, only complicated processing such as the generation of the metadata is performed in the host CPU (software) 51, and the other processing, that is, the writing processing to the storage of the data received from the network 201, is performed in the direct storage access processing device (for instance, an exclusive hardware device). Therefore, the processing efficiency can be improved, and a speed of data transfer can be accelerated. Also, according to the present embodiment, the application can read the data written to the storage by the direct storage access processing device 24 using the normal API (system call or the like) provided by the OS or the like. Therefore, a conventional problem of making the architecture of the application support the proxy is not generated, and simple data read is made possible.

The data receiving device as described above may also be realized using a general-purpose computer device as basic hardware. That is, each block in the data receiving device can be realized by causing a processor mounted in the above general-purpose computer device to execute a program. In this case, the data receiving device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

Furthermore, the data receiving device may include a CPU (Central Processing Unit), a ROM (Read Only Memory) and a RAM as one example of circuitry. In this case, each unit or each element in the data receiving device can be controlled by a CPU's reading out into a RAM and executing a program which is stored in a storage or ROM.

Also, the above-stated hardware configuration is one example and the data receiving device according to an embodiment can be realized by an integrated circuit such as a LSI (Large Scale Integration) or an IC (Integrated Circuit) chip set as one example of circuitry. Each function block in the data receiving device can be realized by a processor, individually, or a part or all of the function blocks can be integrated and realized by one processor. A means for the integrating the part or all of the function blocks is not limited to the LSI and may be dedicated circuitry or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A data receiving device communicating with a communication device on a network, the data receiving device comprising:
    an access processing device accessible to a storage;
    a socket interface configured to establish a session with the communication device according to a first request of an application operating in the data receiving device, wherein the session is identified by at least a TCP (Transmission Control Protocol) port number assigned to the application;
    a communicator configured to receive data via the session from the communication device according to a second request of the application and send the received data to the access processing device;
    a reception controller configured to designate a descriptor of a file to the access processing device to cause the access processing device to write the received data in the file of the descriptor on the storage; and
    a read controller configured to associate a process identifier of the application, the descriptor of the file and an identification of the session to generate registration information,
    wherein, when the read controller receives a data reception request specifying the identification of the session from the application, the read controller retrieves the registration information to specify the descriptor of the file associated with the identification of the session, outputs a read request to the storage for data of the file of the specified descriptor,
    the read controller sends the data read from the storage to the application in response to the data reception request,
    the read controller is configured to register the identification of the session and the process identifier of the application in the registration information when the session interface establishes the session,
    the read controller is configured to retrieve the identification of the session and the process identifier of the application from the registration information when the read controller receives a registration request specifying the identification of the session, the descriptor of the file and the process identifier of the application from the reception controller, and
    the read controller is configured to register the descriptor of the file specified by the registration request to be associated with the identification of the session and the process identifier in the registration information.

2. The device according to claim 1, wherein
    the read controller is configured to specify the descriptor of the file based on the identification of the session specified by the data reception request and the process identifier of the application, and output the read request to the storage for data of the file having the specified descriptor.

3. The device according to claim 2, wherein the read controller is configured to receive a registration request specifying the identification of the session, the descriptor of the file and the process identifier of the application from the reception controller, and register association among the descriptor of the file, the identification of the session and the process identifier specified by the registration request in the registration information.

4. The device according to claim 1, wherein:
the read controller is configured to register the identification of the session in the registration information when the session interface establishes the session, and
when the read controller receives a registration request specifying the identification of the session and the descriptor of the file from the reception controller, the read controller retrieves the identification of the session specified by the registration request from the registration information, and registers the descriptor of the file specified by the registration request to be associated with the identification of the session in the registration information.

5. The device according to claim 1, wherein:
the read controller is configured to receive a registration request specifying the identification of the session and the descriptor of the file from the reception controller, and
the read controller is configured to register association between the descriptor of the file and the session in the registration information, based on the registration request.

6. The device according to claim 1, wherein the read controller is configured to instruct the communicator to write the received data into a memory when the identification of the session specified by the data reception request is not associated in the registration information, the memory being arranged outside the access processing device and accessible by a host CPU on which the application operates.

7. The data receiving device according to claim 1, wherein the read request of the read controller is generated by a system call of an operating system.

8. The device according to claim 1, further comprising:
a host CPU (Central Processing Unit),
wherein the host CPU includes the reception controller and the read controller, and executes the application.

9. The device according to claim 1, wherein the identification session includes at least a set of the TCP port number and a TCP port number of the communication device.

10. The device according to claim 9, wherein the identification of the session includes at least the set further including an IP (Internet Protocol) address of the data receiving device and an IP address of the communication device.

11. The device according to claim 1, wherein the read controller is configured to receive the data reception request via the socket I/F from the application, and send the data read from the storage via the socket I/F to the application.

12. The device according to claim 1, wherein
writing of the data to the file and reading of the data from the file are simultaneously performed by the read controller reading the data from the file in the storage in a period during which the access processing device writes the data in the file in the storage.

13. A data receiving method performed in a data receiving device communicating with a communication device on a network, the method comprising:
establishing a session with the communication device according to a first request of an application operating in the data receiving device, wherein the session is identified by at least a TCP (Transmission Control Protocol) port number assigned to the application;
receiving data from the communication device via the session according to a second request of the application and send the received data to an access processing device accessible to a storage;
designating a descriptor of a file to the access processing device to cause the access processing device to write the received data in the file of the descriptor on the storage;
associating a process identifier of the application, the descriptor of the file and an identification of the session to generate registration information;
retrieving the registration information to specify the descriptor of the file associated with the identification of the session when a data reception request specifying the identification of the session is received from the application, and outputting a read request for data of the file having the specified descriptor to the storage;
sending the data read from the storage to the application in response to the data reception request,
registering the identification of the session and the process identifier of the application in the registration information when the session interface establishes the session,
retrieving the identification of the session and the process identifier of the application from the registration information when a registration request is received specifying the identification of the session, the descriptor of the file and the process identifier of the application, and
registering the descriptor of the file specified by the registration request to be associated with the identification of the session and the process identifier in the registration information.

14. A non-transitory computer readable medium having a program stored therein which, when executed by a computer communicating with a communication device on a network, causes the computer to execute processing comprising:
establishing a session with the communication device according to a first request of an application operating in the data receiving device, wherein the session is identified by at least a TCP (Transmission Control Protocol) port number assigned to the application;
receiving data from the communication device via the session according to a second request of the application and send the received data to an access processing device accessible to a storage;
designating a descriptor of a file to the access processing device to cause the access processing device to write the received data in the file of the descriptor on the storage;
associating a process identifier of the application, the descriptor of the file and an identification of the session to generate registration information;
retrieving the registration information to specify the descriptor of the file associated with the identification of the session when a data reception request specifying the identification of the session is received from the application, and outputting a read request for data of the file having the specified descriptor to the storage; and
sending the data read from the storage to the application in response to the data reception request, registering the identification of the session and the process identifier of the application in the registration information when the session interface establishes the session, retrieving the identification of the session and the process identifier of the application from the registration information when a registration request is received specifying the identification of the session, the descriptor of the file and the process identifier of the application, and registering the descriptor of the file specified by the registration request to be associated with the identification of the session and the process identifier in the registration information.

15. A data receiving device communicating with a communication device on a network, the data receiving device comprising:

an access processing device accessible to a storage;

a socket interface configured to establish a session with the communication device according to a first request of an application operating in the data receiving device, wherein the session is identified by at least a TCP (Transmission Control Protocol) port number assigned to the application;

a communicator configured to receive data from the communication device via the session according to a second request of the application and send the received data to the access processing device;

a reception controller configured to designate a descriptor of a file to the access processing device to cause the access processing device to write the received data in the file of the descriptor on the storage; and a read controller configured to associate the descriptor of the file, a process identifier of the application, and an identification of the session to generate registration information, and store the registration information, wherein, when the read controller receives a data reception request specifying the identification of the session from the application, the read controller retrieves the registration information to specify the descriptor of the file associated with the identification of the session, outputs a read request to the storage for data of the file having the specified description, and receives data read from the storage in response to the read request, and the read controller sends the data received from the storage to the application in response to the data reception request, the read controller is configured to register the identification of the session and the process identifier of the application in the registration information when the session interface establishes the session, and the read controller is configured to retrieve the identification of the session and the process identifier of the application from the registration information when the read controller receives a registration request specifying the identification of the session, the descriptor of the file and the process identifier of the application from the reception controller, and the read controller is configured to register the descriptor of the file specified by the registration request to be associated with the identification of the session and the process identifier in the registration information.

16. The device according to claim 15, wherein the read controller is configured to specify the descriptor of the file based on the identification of the session specified by the data reception request and the process identifier of the application, and output the read request to the storage for data of the file having the specified descriptor.

17. The device according to claim 15, wherein the read controller is configured to register identification of the session in the registration information, receive a registration request specifying the identification of the session and the descriptor of the file from the reception controller, retrieve the identification of the session specified by the registration request from the registration information, and register the descriptor of the file specified by the registration request in the registration information.

* * * * *